Figure 4:
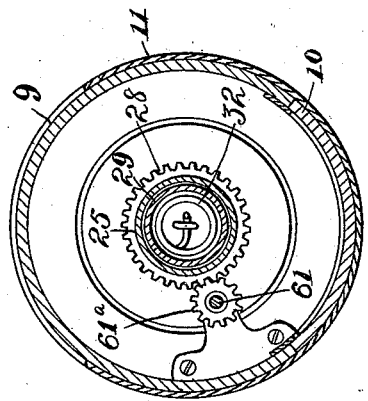

No. 689,650. Patented Dec. 24, 1901.
T. J. MORIARTY.
DEPTH AND ROLLING RECORDER FOR TORPEDOES.
(Application filed Mar. 5, 1901.)
(No Model.) 5 Sheets—Sheet 1.
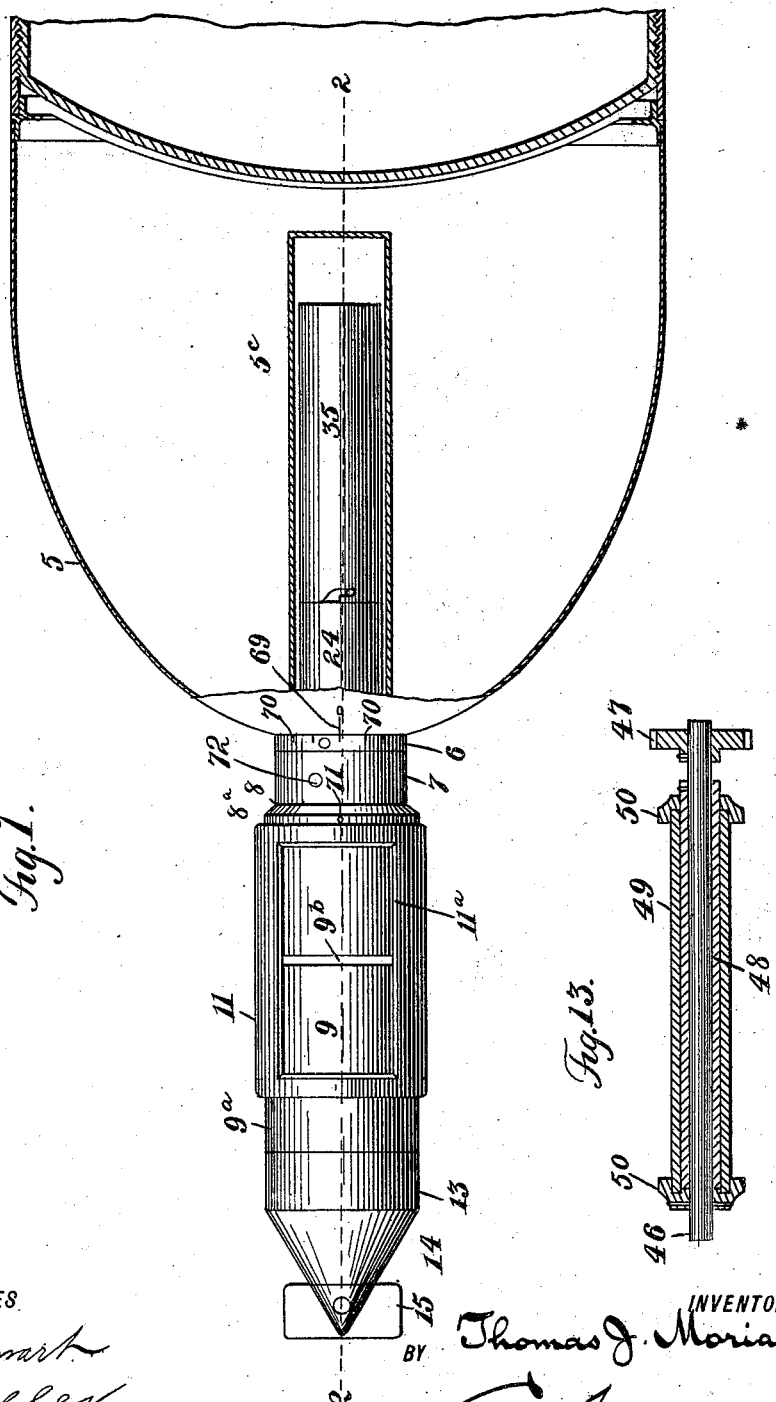

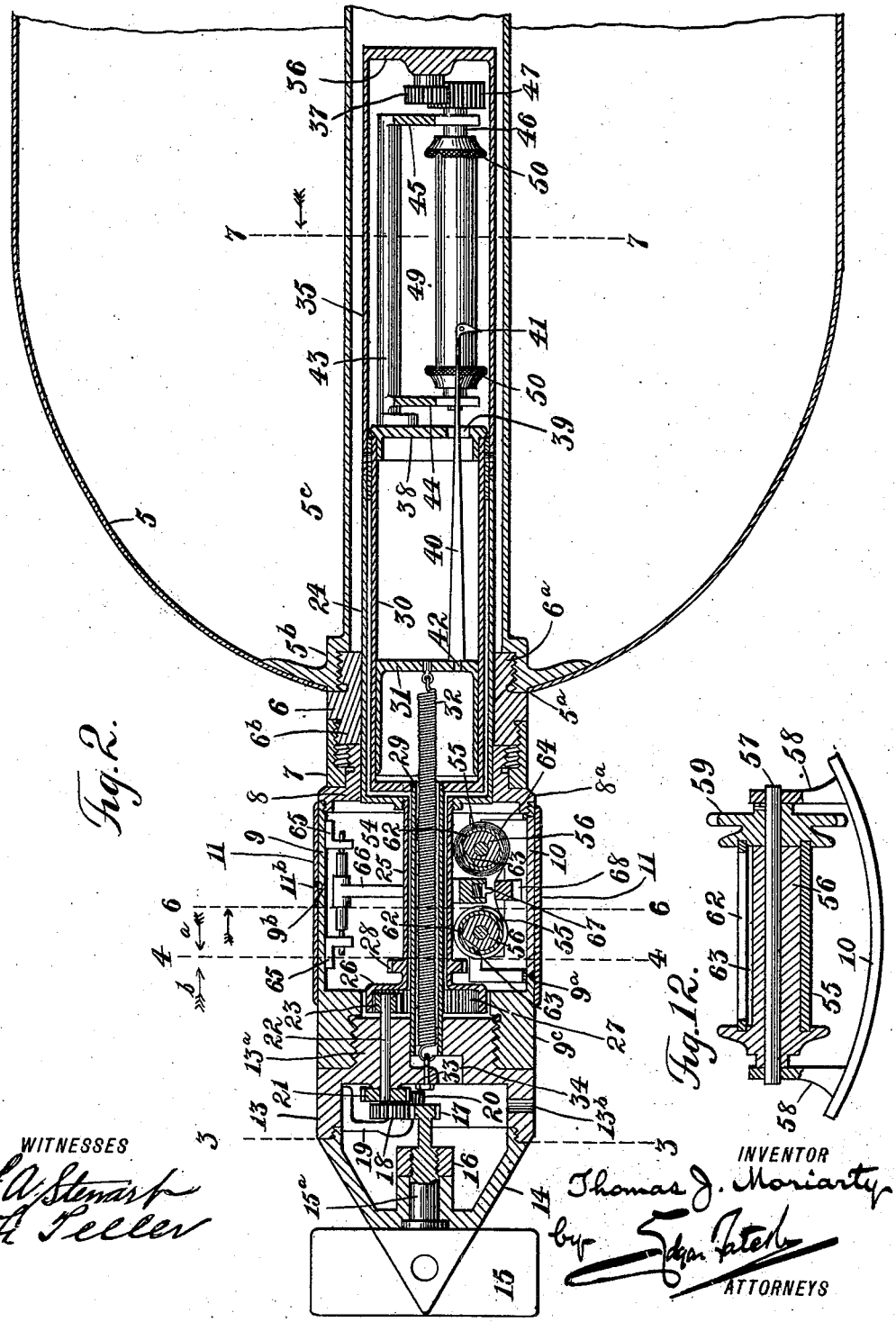

No. 689,650. Patented Dec. 24, 1901.
T. J. MORIARTY.
DEPTH AND ROLLING RECORDER FOR TORPEDOES.
(Application filed Mar. 5, 1901.)

(No Model.) 5 Sheets—Sheet 3.

WITNESSES
F. W. Stewart
F. Seller

INVENTOR
Thomas J. Moriarty
BY Edgar Tate
ATTORNEYS

THE NORRIS PETERS CO., PHOTO-LITHO., WASHINGTON, D. C.

No. 689,650. Patented Dec. 24, 1901.
T. J. MORIARTY.
DEPTH AND ROLLING RECORDER FOR TORPEDOES.
(Application filed Mar. 5, 1901.)
(No Model.) 5 Sheets—Sheet 4.
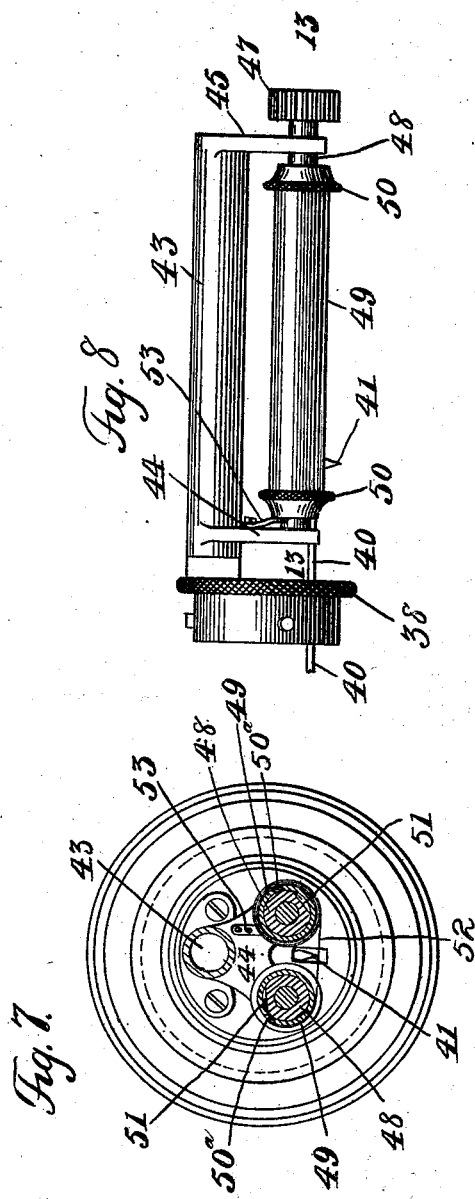
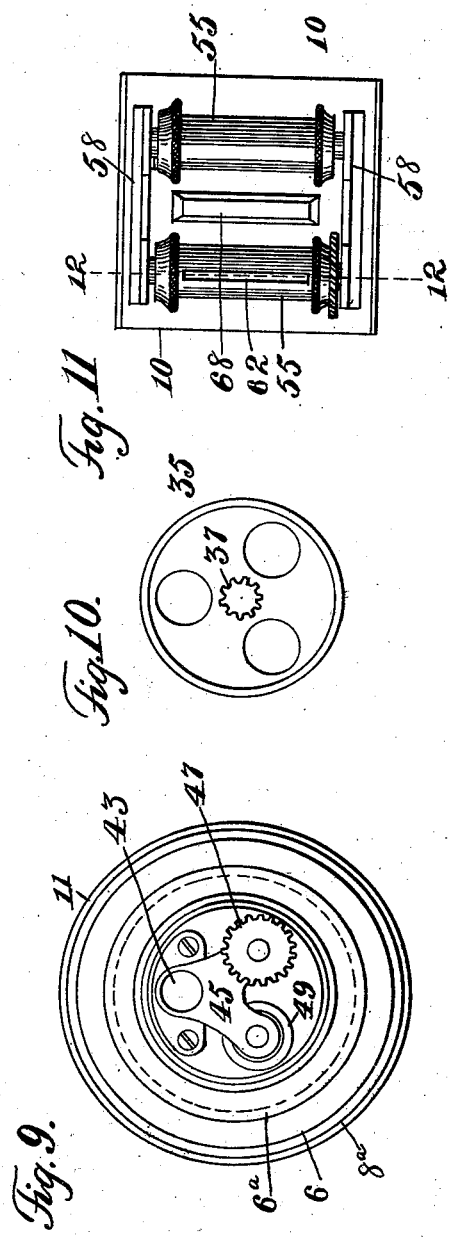
WITNESSES
INVENTOR
Thomas J. Moriarty
BY
Edgar Tate
ATTORNEYS No. 689,650.
Patented Dec. 24, 1901.
T. J. MORIARTY.
DEPTH AND ROLLING RECORDER FOR TORPEDOES.
(Application filed Mar. 5, 1901.)
(No Model.)
5 Sheets—Sheet 5.
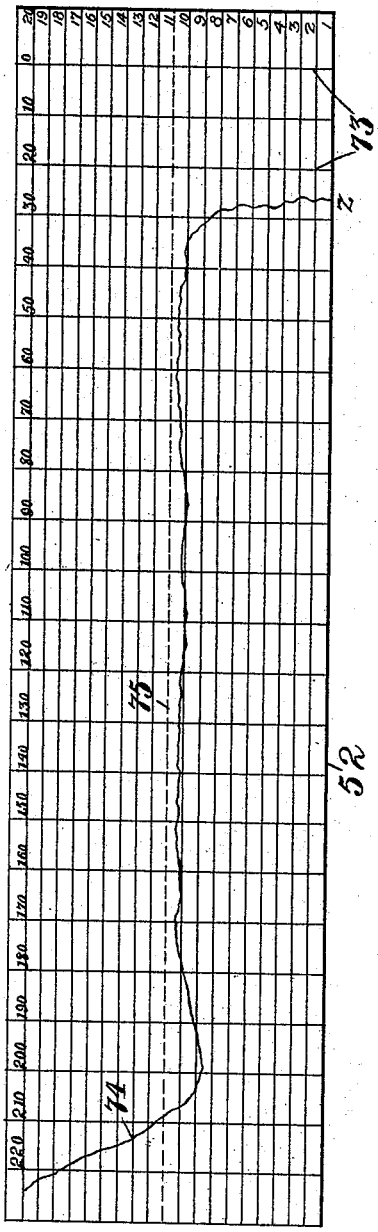
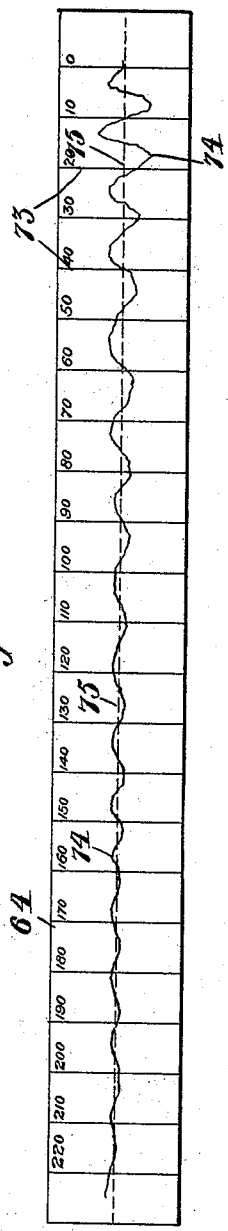
WITNESSES

UNITED STATES PATENT OFFICE.

THOMAS JOSEPH MORIARTY, OF NEWPORT, RHODE ISLAND, ASSIGNOR OF ONE-HALF TO JOHN T. REAGAN, OF NEWPORT, RHODE ISLAND.

DEPTH AND ROLLING RECORDER FOR TORPEDOES.

SPECIFICATION forming part of Letters Patent No. 689,650, dated December 24, 1901.

Application filed March 5, 1901. Serial No. 49,684. (No model.)

*To all whom it may concern:*

Be it known that I, THOMAS JOSEPH MORIARTY, a citizen of the United States, residing at Newport, in the county of Newport and State of Rhode Island, have invented certain new and useful Improvements in Depth and Rolling Recorders for Torpedoes, of which the following is a full and complete specification, such as will enable those skilled in the art to which it appertains to make and use the same.

This invention relates to torpedoes; and the object thereof is to provide a device for measuring at one test or experiment the rolling movement of a torpedo as it passes through the water and also the depth to which it passes in the water. It has been the custom heretofore to make each of these tests or experiments by separate instruments at different times, and this is an expensive operation, as well as one which involves much time, by reason of the fact that the torpedo had to be discharged or fired in order to make one of said tests or experiments and then recovered and discharged or fired in order to make the other test or experiment, a separate instrument being used for each. In my invention, however, I combine in a single device or instrument means for making both of said tests or experiments at the same time, and thus save a great expense and also much time.

The invention is fully disclosed in the following specification, of which the accompanying drawings form a part, in which the separate parts of my improvement are designated by the same reference characters in each of the views, and in which—

Figure 6:
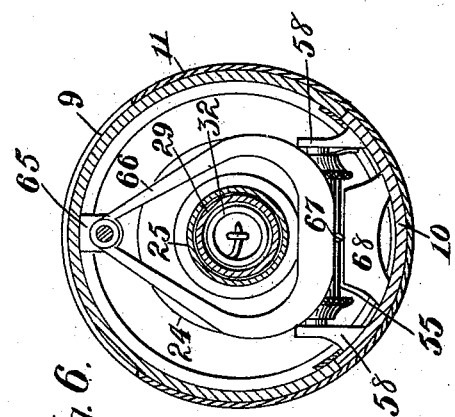
Figure 3:
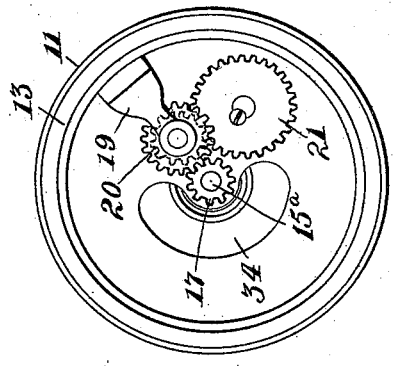
Figure 5:
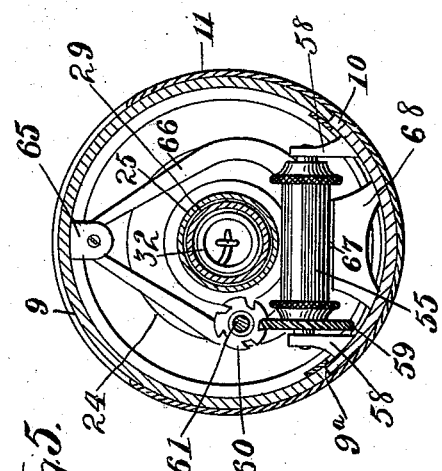

Figure 1 is a sectional plan view of the head of a torpedo provided with my improvement; Fig. 2, a partial longitudinal vertical section on the line 2 2 of Fig. 1; Fig. 3, a transverse section on the line 3 3 of Fig. 2; Fig. 4, a transverse section on the line 4 4 of Fig. 2 looking in the direction of the arrow *a;* Fig. 5, a transverse section on the line 4 4 of Fig. 2 looking in the direction of the arrow *b;* Fig. 6, a transverse section on the line 6 6 of Fig. 2; Fig. 7, a transverse section on the line 7 7 of Fig. 2; Fig. 8, a side view of a portion of the device for measuring the diving movement of the torpedo; Fig. 9, an end view thereof and showing the same in position in the instrument and showing the outer casing of said part removed; Fig. 10, an inside view of said casing; Fig. 11, a plan view of a part of the instrument used for measuring the rolling movement of the torpedo; Fig. 12, a section thereof on the line 12 12 of Fig. 11; Fig. 13, a partial section on the line 13 13 of Fig. 8, and Figs. 14 and 15 are plan views of record-strips which I employ.

In the foregoing views of the drawings Figs. 1 and 2 are on a reduced scale, but of the remaining views Figs. 3 to 12, inclusive, are of full size.

In the drawings forming part of this specification, reference being made to Figs. 1 and 2, I have shown at 5 the head of a torpedo, part of said head being omitted in Fig. 2, and this head in actual use of the torpedo contains the explosive material and is known as the "war-head" of the torpedo; but in the testing or measuring of the movement of the torpedo contemplated by this invention this head is filled with water or other material which will give to the torpedo the weight which it has in actual use, or the war-head may be detached and a testing-head put in its place, and this head, as shown in the drawings, is provided with an opening $5^a$, to which is secured a screw-threaded collar $5^b$, provided with a tubular casing $5^c$, and in the construction of my improvement I provide a tubular casing 6, provided at one end with a reduced screw-threaded extension $6^a$, which is adapted to be screwed into the collar $5^b$, and at the opposite end with a reduced screw-threaded locking-band 7, into which is screwed a collar 8, having an enlarged outer end portion $8^a$, with which is connected, by means of a screw-thread or otherwise, a cylindrical casing 9, which is provided, preferably in the bottom thereof, with an angular opening $9^a$, into which is set a segmental plate 10, which is held in place by a sleeve 11, which is free to turn on the casing 9 and which is open at one side, as shown at $11^a$, and the plate 10 is adapted to be inserted into position within the cylindrical casing 9, of which it forms a detachable part, through the opening $11^a$ and to be removed through said opening whenever desired. The cylindrical casing 9 is also provided with a transverse groove $9^b$, through which passes a pin, lug, or other device 11ᵇ, secured to the sleeve 11, and said sleeve is free to turn on the casing, and by means thereof the opening 9ª may be closed and the plate 10 securely held in place.

The cylindrical casing 9 is provided at its front end with a thickened portion 9ᶜ, which is screw-threaded interiorly, and I also provide an annular head 13, provided with a screw-threaded neck 13ª, which is screwed into the thickened portion 9ᶜ of the casing 9 and with which is connected, preferably by means of a screw-thread, a conical head 14. The annular head 13 is provided with an opening or openings 13ᵇ, through which the water is free to pass, and the conical head 14 is provided with the usual propeller 15, having a screw-threaded shank 15ª, which passes through the end of the conical head 14 and is held in place by a nut 16, and said shank 15ª is provided at its inner end with a pinion 17, which operates in connection with a gear-wheel 18, supported by an arm 19, secured to the annular head 13, and the wheel 18 is provided with a pinion 20, which operates in connection with a gear-wheel 21, secured to a shaft 22, which passes inwardly through the neck 13ª of the annular head 13 and which is provided at its inner end with a pinion 23.

Within the tubular casing 6 is loosely placed a tube 24, which is free to turn in said tubular casing 6 and the outer end of which is provided with a tube or sleeve 25, which is enlarged at its extreme outer end to form an annular casing 26, provided with an internal gear 27 and in connection with which the pinion 23 operates, and in practice the sleeve 26 and the tube 24 are turned by the pinion 23, and said sleeve or tube 25 is provided near its extreme outer end with an annular gear 28.

Within the neck 13ª of the annular head 13 is secured a tube 29, which passes into the outer end of the tube 24 and with which is connected a tube 30 in which is placed a cup-shaped piston 31, and secured to the piston 31 is a spiral spring 32, which passes through the tube 29 and is connected at 33 with the annular head 13, and the tube 30 is placed in communication with the open space in the annular head 13 by means of the tube 29 and a port or passage 34 in the neck 13ª of the annular head 13. The tube 24 is provided at its inner end with a detachable tubular casing 35, the outer end of which is open, as shown in Fig. 10, and provided with a pinion 37, and the inner end of the tube 30 is closed by a detachable end piece 38, provided with an opening 39, through which passes the spring-arm 40 of a stylus 41, said arm being secured at 42 to the piston 31. The detachable end piece 38 of the tube 30 is provided with an arm 43, which is provided at the end thereof adjacent to the tube 30 with a support 44, which projects at a right angle therefrom, and at its opposite end with a support 45, which projects at a right angle therefrom, and mounted in the supports 44 and 45 are two shafts 46, one of which is provided with a gear-wheel 47 and is operated by the pinion 37. Each of the shafts 46 is provided with a tubular casing 48, on each of which is placed a sleeve 49, and said casing and said sleeve are adapted to turn one upon or one within the other, and this operation may be secured by means of milled heads 50, connected with said sleeve and said casing. One of the shafts 46 (that with which the gear-wheel 47 is connected) is rigidly secured to the tubular casing 48 through which it passes, and each of the tubular sleeves 49 is provided, as shown in Fig. 7, with a longitudinal slot 50ª, and each of the tubular casings 48 is cut away at one side or reduced longitudinally to form a space 51, and the sleeves 49 form rollers, on which is wound a record-strip 52, and in connecting the record-strip 52 with the rollers 49 the ends thereof are passed through the slots 50 into the open space 51 of the tubular casings 40, and said sleeve or casing is then turned so as to secure the ends of said strip in position. The details of this construction are best shown in Figs. 2, 3, and 7, and at one end of one of the sleeves or rollers 49 is placed a friction-spring 53, which prevents said sleeve or roller from turning too freely.

The spring-arm 40 of the stylus 41 passes through the bottom portion of the support 44, and the stylus 41 is directed downwardly, so as to bear on the record-strip 52, as clearly shown in Fig. 7, and said record-strip is preferably composed of paper, paper and canvas, or other suitable material chemically prepared in such manner that the stylus 41 in moving thereover will leave a mark similar to the mark of a lead-pencil.

The sleeves or rollers 49, the record-strip mounted thereon, the stylus 41, and means for operating said rollers or sleeves and for operating the stylus, as hereinafter described, constitute the mechanism for measuring the diving movement of the torpedo, while the devices for measuring the rolling movement of the torpedo are placed in the chamber 54 within the casing 9, and which is closed by the plate 10. These devices are clearly shown in Figs. 2, 5, 6, 11, and 12 and consist of sleeves or rollers 55, through each of which is passed a tube 56, in each of which is placed a shaft 57, and the shafts 57 are supported by brackets 58, connected with the segmental plate 10, and one of the shafts 57 is provided with a worm gear-wheel 59, which is operated by a worm-gear 60, supported by a shaft 61, and the shaft 61 is provided with a pinion 61ª, operated by the annular gear 28. The sleeves or rollers 55 are each provided with a longitudinal slot 62, and the tubes 56 are cut out correspondingly at one side to form longitudinal spaces 63, and these sleeves or rollers 55 are designed to receive a record-strip 64, which is wound thereon and the ends of which are secured thereto by being passed through the slots 62 into the spaces 63, after which said sleeves or rollers or said tubes are turned so as to secure the ends of the strip in place. It will be understood, however, that one of the shafts 57 is secured to the tube 56, through which it passes, this construction being necessary in order that the rollers or sleeves may be operated by means of the gear-wheel 59.

Suspended from the top of the casing 9 are two supports 65, from which is suspended a swinging stylus-support 66, which is open at the center and through which the parts 25, 29, and 32 pass, and this stylus-support 66 is provided at its lower side with a stylus 67, which is adapted to bear on the record-strip 64 between the sleeves or rollers 65, and this mechanism, including the sleeves or rollers 55, the stylus 67, and the stylus-holder 66, together with the record-strip 64, constitute the means for measuring or recording the rolling movement of the torpedo. The plate 10 is also provided with a transverse support 68, over which the record-strip passes, the object of this construction being to provide a support for said strip in order that the stylus may properly operate thereon, and this record-strip is prepared in the same manner as the corresponding strip on the sleeves or rollers 49. It will be understood that in the operation of this mechanism the stylus-support 66 must always hang in a vertical position, and in order that the recording device may be properly connected with the torpedo I provide the head of the torpedo at the point where the connection of the recording device is made therewith and in a central vertical line with an index-mark 69, as shown in Fig. 1, and the casing 6 is provided with a plurality of corresponding marks 70. The outer end of the collar 8, which is enlarged and designated by the reference character 8$^a$, is also provided with an index-mark 71, and the index-marks 69 and 71 are preferably designated on the torpedo and on the record device by zero, as shown in Fig. 1. In practice the casing c is screwed up until one of the index-marks 70 registers with the index-mark 69 on the torpedo. The testing instrument or recording device is then turned until the index-mark 71 is in line with the index-mark 69, and the locking-band 7 is then turned by means of a spanner until the testing instrument is securely locked in connection with the torpedo, and the locking-band 7 is provided, as shown in Fig. 1, with a hole or opening 72, by means of which a spanner may be connected therewith.

From the construction hereinbefore described it will be seen that the casing 9 of the recording device is held stationary, while the tube 24 and sleeve 25 are turned by the propeller 15 as the torpedo passes through the water. It also will be seen that the sleeve 25 is geared in connection with one of the rollers 55, on which the record-strip 64 is wound, and in this operation the said strip is drawn from one of said rollers and rewound on the other. The tube or casing 35 also turns with the tube 24, and the pinion 37, connected with said tube or casing, operating in connection with the gear-wheel 47 on one of the shafts 46, revolves the sleeve or roller on said shaft, and the record-strip 52 is drawn from one of said rollers and rewound on the other. As the torpedo passes through the water the latter enters the recording device through the opening or openings 13$^b$ in the annular head 13 and passes backwardly through the neck of said head and through the tube 29 into the tube 30 and into the piston 31 and forces said piston backwardly, and this pressure of course increases as the torpedo passes deeper into the water. The backward movement of the piston 31 operates in a corresponding manner the stylus 41, and said stylus moves back and forth across the recorder-strip 52, and as said recorder-strip 52 is drawn from one of the rollers or sleeves 49 onto the other an irregular mark is made longitudinally of said strip by said stylus. As the torpedo passes through the water it has to some extent a rolling motion, and the stylus 67 is intended to measure this motion on the record-strip 64, and an irregular line is made by said stylus longitudinally of said strip as the latter is drawn from one of the rollers or sleeves 55 and rewound on the other.

In Fig. 14 I have given a plan view of the record-strip 52, and in Fig. 15 a plan view of the record-strip 64, and these record-strips are of the same length, the strip 52 being preferably wider than the strip 64, and said strips are also provided with transverse lines 73, which are preferably numbered from one end of the said strips to the other, as shown in said figures, the numbers employed being "10" and multiples of ten and said numbers representing rods and multiples of rods.

After the experiment or test has been made and the torpedo has been recovered the recording device is removed and taken apart and the record-strips 52 and 64 are placed side by side or edge to edge, and the variations or curvatures of the black lines 74, which are made by their respective styli as they pass over said strips, indicate the depth to which the torpedo has passed as it passes through the water and also the rolling motion thereof. In Figs. 14 and 15 the dotted lines 75 indicate what should be the movement of the stylus as it passes over these strips, and the object of making the test or tests is to cause the torpedo to move as nearly as possible in a true line, and by adjusting the propelling and the steering mechanism of the torpedo this object may be approximately accomplished. It will be understood, of course, that the torpedo is weighted or provided with a keel, which holds it in the proper position as it passes through the water or keeps it right side up, and also with the usual mechanism for propelling and steering it, and by properly adjusting the steering and propelling devices or mechanism the control of the torpedo may be secured. If the torpedo rolls too much or the diving movement thereof cannot be controlled, it is practically useless to attempt to use the same in warfare or for any practical purpose, and it is absolutely necessary to control the rolling and diving movement of the torpedo, which can only be done by properly adjusting the propelling and steering mechanism and by knowing what the rolling and diving movement is in order that the adjustment of the propelling and steering mechanism may be properly made, and by placing the record-strips 52 and 64 together in the manner herein described it may be determined at what point during the passage of the torpedo over its course the rolling and diving movements were irregular and too great, and the mechanism of the torpedo may be adjusted so as to overcome the difficulty.

It will be apparent that the piston 31 and stylus 41, connected therewith, are moved in one direction by the spring 32 and in the opposite direction by the water entering said piston, as hereinbefore described. It will also be understood that my improvement, which I call a "combined depth and rolling recorder for torpedoes," may be applied to any torpedo of the usual construction, whether the same be of the Whitehead or any other class, and it will be apparent that changes in and modifications of the construction herein described may be made without departing from the spirit of my invention or sacrificing its advantages.

The torpedo-shaft 22 may be provided with any desired means for preventing leakage, and the propeller may be provided with ball-bearings of the usual or any preferred construction, and the locking-band 7 may be turned by hand, if desired, or by any suitable means, and in practice the spiral spring 32 is made adjustable or so formed as to adapt the same to torpedoes of different speeds, it being evident that a spring for a torpedo of low speed would not be suitable for a torpedo of high speed.

The record-strip 52, in addition to being ruled transversely, as hereinbefore described and as shown in the drawings, is also ruled longitudinally, the longitudinal lines denoting feet and being numbered, as shown, and the point from which the stylus starts on this strip is designated by the reference-letter $z$, and by means of this arrangement it will be apparent that the movement of the stylus may be determined at a glance. The record-strip 64 may also be ruled longitudinally, if desired, and other changes in and modifications of this construction may be made, as will be apparent.

Although I have shown and described my improvement as applicable to torpedoes, it will be apparent that the same may be applied to any submarine boat, vessel, or other object, and wherever in this specification and in the following claims the word "torpedo" is employed I desire it to be understood as including any kind or class of a submarine torpedo, vessel, or object designed or adapted to be propelled through water.

Having fully described my invention, what I claim as new, and desire to secure by Letters Patent, is—

1. A combined depth and rolling recorder for torpedoes, comprising a device adapted to be connected with the head of the torpedo and which is provided with a propeller and two recording devices, one of which is adapted to be operated by said propeller and the rolling movement of the torpedo and the other by said propeller and by the pressure of the water which passes into the instrument, substantially as shown and described.

2. A depth and rolling recorder for torpedoes, containing two separate recording devices, one of said devices serving to record the rolling movement of the torpedo and the other the diving movement thereof, and means whereby the said devices are simultaneously operated by the torpedo as it passes through the water, substantially as shown and described.

3. A combined depth and rolling recorder for torpedoes, comprising a casing adapted to be connected with the head of the torpedo and provided with a propeller, two recording devices within said casing, one of which is adapted to record the rolling movement of the torpedo and the other the diving movement thereof, each of said recording devices involving a record-strip adapted to be moved from one support to another by the movement of the propeller, and one of said recording devices being provided with a stylus operating in connection with the record-strip thereof, and operated by the rolling movement of the torpedo and, the other recording device being provided with a stylus operating in connection with the register-strip thereof, said stylus being operated in one direction by the pressure of the water through which the torpedo passes, and in the other by a spring, substantially as shown and described.

4. A combined depth and rolling recorder for torpedoes consisting of an instrument adapted to be connected with the head of the torpedo and to project therefrom and thereinto and provided at its outer end with a propeller, said instrument being provided with two separate recording devices each of which comprises a pair of rollers adapted to receive a recording-strip, and a stylus operating in connection with said strip as it is turned from one of said rollers to the other, one stylus being adapted to be operated by the rolling movement of the torpedo and the other by the pressure of the water through which the torpedo passes and by a spring connected therewith, the rollers of each recording device being geared in connection with the propeller, substantially as shown and described.

5. A torpedo provided with a combined depth and rolling recorder, said recorder consisting of an instrument inserted into the head of the torpedo and provided with two separate recording devices, one of which serves to record the rolling movement of the torpedo and the other the diving movement thereof, and means whereby said recording devices are simultaneously operated by the torpedo as it passes through the water, substantially as shown and described.

6. A combined depth and rolling recorder for torpedoes comprising a single device adapted to be connected with the head of a torpedo and to project therefrom and thereinto and provided at its outer end with a propeller, said device being also provided with two separate recording devices, each of which involves a strip of record material and devices connected with the propeller for moving said strip longitudinally and a stylus operating in connection with each of said strips, the stylus which operates in connection with one strip being operated by the rolling movement of the torpedo as it passes through the water and the stylus of the other recording device being operated by the pressure of the water and by a spring, substantially as shown and described.

7. A combined depth and rolling recorder for torpedoes comprising a casing adapted to be secured in the head of a torpedo and containing two separate recording devices, said casing being also provided with a propeller, one of said recording devices comprising two rollers adapted to receive a record-strip and to be operated by said propeller, and a pivoted stylus adapted to swing transversely of the casing and to operate in connection with said strip, the other recording device comprising two rollers adapted to receive a record-strip and to be operated by the propeller and a stylus operating in connection with said strip and adapted to be operated in one direction by the presence of the water through which the torpedo passes, and in the opposite direction by a spring, substantially as shown and described.

8. In a recording device, two separate rollers composed of an outer casing and an inner tubular member and a shaft passing through said member, said outer casing being provided with a longitudinal slot and the inner member being provided with a cam-surface, substantially as shown and described.

9. A record device of the class specified comprising a casing, a propeller connected therewith, two rollers mounted in said casing and adapted to receive a record-strip, one of said rollers being geared in connection with said propeller, and a stylus operating transversely of said strip, substantially as shown and described.

10. A device of the class described, adapted to be connected with the head of a torpedo and provided with a propeller, said device being provided with means for recording the diving movement of the propeller, comprising two rollers adapted to receive a record-strip and to be operated by said propeller, a stylus operating transversely of said strip and adapted to be operated in one direction by the pressure of the water through which the torpedo passes and in the opposite direction by a spring, and another recording device comprising two rollers adapted to receive a record-strip and to be operated by the propeller, and a stylus pivotally supported and operating in connection with said strip and adapted to be operated by the rolling movement of the torpedo as it passes through the water, substantially as shown and described.

11. A device adapted to be connected with the head of a torpedo for recording the diving movement thereof, said device comprising a casing provided at its front end with a propeller, two rollers mounted in said casing and adapted to receive a record-strip and a stylus movable transversely of said strip, said rollers being geared in connection with said propeller, and said stylus being operated in one direction by the pressure of the water through which the torpedo passes, and in the other direction by a spring, substantially as shown and described.

12. A combined depth and rolling recorder for torpedoes, comprising a device adapted to be secured in the head of the torpedo and provided with means for measuring the depth to which the torpedo passes in the water, said device being also provided with a recorder operated by the movement of the torpedo through the water and by the rolling movement of the torpedo to record the amount of said rolling movement, substantially as shown and described.

In testimony that I claim the foregoing as my invention I have signed my name, in presence of the subscribing witnesses, this 27th day of February, 1901.

THOMAS JOSEPH MORIARTY.

Witnesses:
CHARLES S. CRANDALL,
WILLIAM GEIB.